Sept. 12, 1950    C. N. HARDIN ET AL    2,522,223
BARBECUE AND CAMPFIRE COOKING APPARATUS SUPPORT
Filed June 28, 1946

Inventors:
Clarence N. Hardin
Brainard W. Tenney
by: [signature]
Attorney.

Patented Sept. 12, 1950

2,522,223

UNITED STATES PATENT OFFICE 2,522,223

BARBECUE AND CAMPFIRE COOKING APPARATUS SUPPORT

Clarence N. Hardin and Brainard W. Tenney, Los Angeles, Calif.

Application June 28, 1946, Serial No. 679,902

1 Claim. (Cl. 248—124)

This invention relates to a new and useful utensil for cooking meat and other edibles over an open fire or fireplace such as a barbecue. In cooking and toasting meat, bread and other edibles or objects it is desirable to turn and hold the piece of meat so as to retain its juices within the meat and at the same time cook the meat evenly. It is also desirable in toasting bread to expose and hold opposite sides so as to toast, brown or cook both sides evenly. It is also desirable to treat other edibles in a similar manner. This action is accomplished by our improvement. It is also desirable to raise and lower or otherwise adjust the device to take advantage of various stages of heat from a fire. This also is attained by our improvement. Another object or advantage is the production of a device of its kind by which a fork, grill or other cooking or holding implement is provided which can be held and manipulated over a fire for cooking purposes at any desired distance therefrom. Another object is the provision of an improved apparatus which can be easily dismantled and packed in a compact package for convenience in transporting. Among still further objects are maximum simplicity of construction and improved effectiveness in use.

Figure 1:
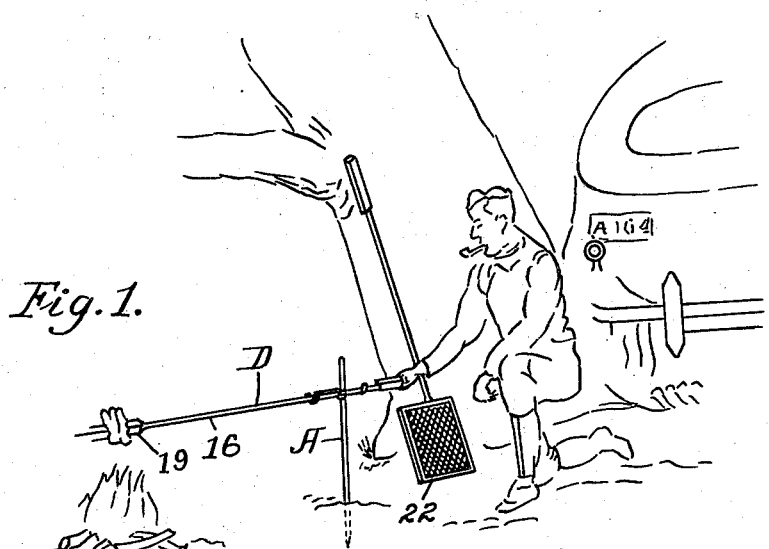
Figure 3:
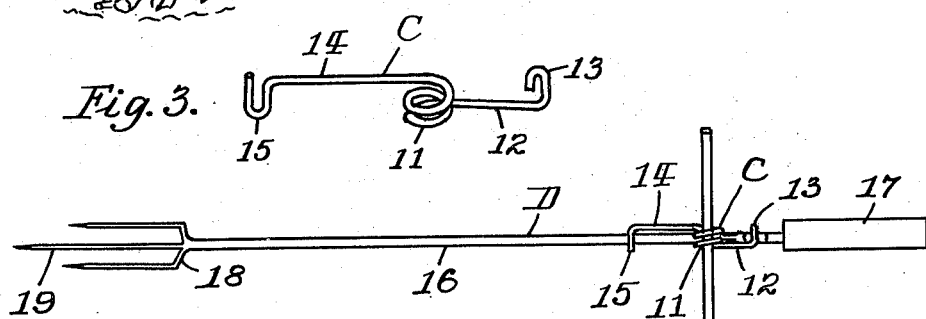
Figure 2:
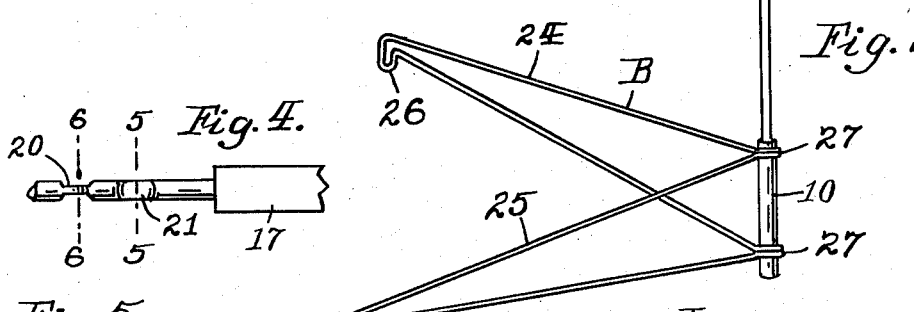
Figure 4:
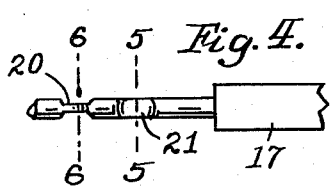
Figure 5:
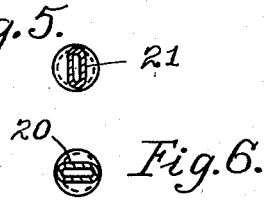
Figure 6:

In the drawing forming part of this specification, Fig. 1 is a pictorial view illustrating the use of our improved barbecue and camp fire implement; Fig. 2 is a side elevation partly in perspective of our improved cooking utensil when assembled for use; Fig. 3 is a perspective view of the adjustable slide by which the cooking utensil is adjustably supported on an upright support; Fig. 4 is a plan of a detail portion of the shank of the cooking utensil, and Figs. 5 and 6 are respectively sections on the lines 5—5 and 6—6 of Fig. 4.

In the drawing, A is a standard which may be an upwardly extending supporting rod of angular or any other cross sectional shape, said standard being sharpened at its lower end so that it may be easily struck into the ground as shown in Fig. 1 or may be inserted by its lower end into an upwardly extending cylindrical holding sleeve or socket 10 forming part of a stand B as shown in Fig. 2 to be hereinafter described. A slide C is adjustably mounted upon the upper portion of the standard for supporting a cooking implement D of any desired kind.

The slide comprises a relatively short section of heavy wire formed into a coil 11, the inner diameter of which is of sufficient size to loosely but closely engage over and normally slide lengthwise on the standard. The axial length and number of convolutions of the coil is sufficient so that when the slide is tilted in a vertical plane it will engage the standard automatically and prevent sliding, thus functioning as an automatic support for any load which is carried by the slide. The ends or arms of the coil are extended in opposite substantially aligned direction from the coil. One arm 12 is formed with a downwardly directed hook or loop 13 and the opposite arm 14 is formed with an upwardly directed hook or loop 15. The arm 14 is preferably longer than the arm 12 to augment tilting tendency of the slide as will be hereinafter described.

The loops 13 and 15 are directed transversely in relative alignment to each other on one side of the coil which grips the standard to provide clearance on one side of the standard for the handle rod or shank of a suitable implement D.

The cooking implement D as shown resembles a long handle rod or shank 16 having a handle 17 on its rearward end portion and a fork 18 with pointed tines 19 on its forward end portion for impinging and holding meat or other edible or objects over or near a fire. In use the forward end portion of the shank 16 is applied downwardly in the loop 15 on the end of the arm 14 facing the fire and its rearward portion is engaged upwardly below the loop 13 on the rearward extending arm 12. The weight on the fork end tends to overbalance the handle end of the shank whereby the coil tends to tilt and is caused to engage and pinch the standard A under biting tension and hold the cooking utensil at any adjusted height on the standard and at an angle horizontally at which the utensil is adjusted by the user.

The shank 16 of the cooking implement as shown is tubular (Figs. 4 to 6 inclusive) and is provided with two longitudinally spaced indentures forming keys 20 and 21 near its handle portion. These key indentures are set at right angles or at any other angle desired in relation to each other. Hook 13 is adapted to engage the shank in one or the other of the key indentures to hold the cooking implement from rotating on its support, whereby the meat or other edible or object held by the fork or other holding means may be maintained at any desired angle or at any desired distance from a fire to expose opposite sides of the object to the heating effect of a fire.

The coil 11, it will be noted is a helical spring which is slidably engaged on the standard and which increases the gripping action by the leverage exerted by the shank on the forwardly and rearwardly extending supporting arms 12 and 14.

Any other type of cooking implement may be employed having a shank handle rod and keys therein as above described. For instance a grill 22 shown in Fig. 1, or any other desired style of holder in place of the fork above described may be provided for holding and exposing an object to heat from a fire.

A stability base frame B may be provided for supporting the standard A which is particularly adapted for holding the device in upstanding position before a barbecue or other fire place as well as before any kind of camp fire, said base frame comprising a pair of laterally extending foot members 24 and 25 made out of wire or other suitable material. When made out of wire the outer end portions are looped downwardly to provide upstanding supports 26 and its inner end portions are hingedly connected at 27 to the tube or socket member 10, whereby the base frame may be folded or unfolded. In unfolded condition the foot members are spread apart to provide supporting stability and when folded the device can be made to form a compact package.

In use the device is set up as shown in Fig. 1 before a fire or fireplace and assuming that meat or other edible is to be cooked, first the same will be placed on the fork 18 or in the grill 20. The slide C is adjusted both in elevation and direction as best suits the heat from the fire. The cooking implement D is then fixed in engagement with the slide by the appropriate key indentures 20 and 21 in the shank 16. In one position the cooking implement is adapted to be held by the key indentures in the handle shank so as to expose one side of the object on the fork or in the grill to the heat of the fire, and in another position the key or keys are reversed resulting in the opposite side or other side of the object being exposed to the direct effect of the heat.

Modifications in construction are contemplated within the spirit of our invention and the scope of the following claim.

We claim:

A device of the class set forth, comprising a standard, a slide embracing and slidable longitudinally on said standard, said slide having oppositely extending arms and adapted when tilted to engage said standard automatically and support a load, said arms having opposite downwardly and upwardly directed loops on their outer end portions, and a cooking implement having a handle shank, said loops being disposed in relative alignment at one side of said standard and adapted to provide clearance for movably engaging the median portion of said shank and supporting the cooking implement, and said shank having multiple key means adapted to engage at least one of said loops, whereby the cooking utensil may be locked in any one of a plurality of reversable positions.

CLARENCE N. HARDIN.
BRAINARD W. TENNEY.

REFERENCES CITED

The following references are of record in the file of this patent:

UNITED STATES PATENTS

| Number | Name | Date |
|---|---|---|
| 1,423,612 | Jewett | July 25, 1922 |
| 1,537,237 | Kaestner | May 12, 1925 |
| 1,753,501 | Christensen | Apr. 8, 1930 |